(12) United States Patent
Matsuba et al.

(10) Patent No.: US 8,492,490 B2
(45) Date of Patent: Jul. 23, 2013

(54) APPARATUS FOR MANUFACTURING POLYMER RESIN, POLYMERIZATION VESSEL, AND METHOD FOR MANUFACTURING POLYMER RESIN

(75) Inventors: Kenichirou Matsuba, Chiba (JP); Kazushige Kimura, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 315 days.

(21) Appl. No.: 13/119,946

(22) PCT Filed: Sep. 18, 2008

(86) PCT No.: PCT/JP2008/066837
§ 371 (c)(1),
(2), (4) Date: Mar. 18, 2011

(87) PCT Pub. No.: WO2010/032302
PCT Pub. Date: Mar. 25, 2010

(65) Prior Publication Data
US 2011/0178254 A1 Jul. 21, 2011

(51) Int. Cl.
*C08F 2/04* (2006.01)
*B01J 19/18* (2006.01)
*B01F 5/06* (2006.01)
*C08F 220/44* (2006.01)

(52) U.S. Cl.
USPC ............ 526/67; 526/88; 526/342; 526/918; 422/132; 422/135; 366/176.1

(58) Field of Classification Search
USPC .............. 526/67, 88, 342, 918; 422/132, 135; 366/176.1
See application file for complete search history.

(56) References Cited

U.S. PATENT DOCUMENTS 3,681,308 A * 8/1972 Irvin et al. ............ 526/88
4,198,383 A 4/1980 Konsetov et al.
6,355,743 B1 3/2002 Ooura et al.

FOREIGN PATENT DOCUMENTS

EP 0701863 A2 3/1996
EP 0702033 A1 3/1996

(Continued)

OTHER PUBLICATIONS

Decision of Grant issued Mar. 19, 2012 in Russian Patent Application No. 2011115068.

(Continued)

*Primary Examiner* — Fred M Teskin
(74) *Attorney, Agent, or Firm* — Knobbe Martens Olson & Bear LLP

(57) ABSTRACT

An apparatus for manufacturing a polymer resin comprises a polymerization vessel, a bearing part, a protection part, a circulating cooling means, a raw material-injecting nozzle and a flow path-constituting part. The protection part forms a first flow path between the protection part and the side face of the agitation axis. The circulating cooling means includes a circulating inlet nozzle provided on a side face of the protruding part so as to be opposite to the protection part. The flow path-constituting part is provided between the bearing part and the protection part so as to cover the side face of the agitation axis, to fix the bearing part and the protection part. This flow path-constituting part forms a second flow path between the side face of the agitation axis and the flow path-constituting part and a third flow path for coupling the second flow path with the raw material-injecting nozzle. The first to third flow paths constitute a continuous flow path and an uppermost end of the first flow path is opened to the inside of the protruding part. The gap, part of the first flow path other than the uppermost end, the second flow path and the third flow path are isolated from the inside of the protruding part.

14 Claims, 7 Drawing Sheets

FOREIGN PATENT DOCUMENTS

| | | |
|---|---|---|
| JP | 1972-610 | 1/1972 |
| JP | 1973-29628 | 9/1973 |
| JP | 1973-29797 | 9/1973 |
| JP | 1980-35912 | 3/1980 |
| JP | 1980-36201 | 3/1980 |
| JP | 2004-18560 | 1/2004 |
| JP | 2004-018560 | 1/2004 |
| RU | 1627241 A1 | 2/1994 |
| SU | 1627243 A1 | 2/1991 |

OTHER PUBLICATIONS

International Search Report; Application No. PCT/JP2008/066837.
Extended European Search Report and Search Opinion mailed Feb. 29, 2012 in corresponding European Application No. 08810881.6.

* cited by examiner

US 8,492,490 B2

APPARATUS FOR MANUFACTURING POLYMER RESIN, POLYMERIZATION VESSEL, AND METHOD FOR MANUFACTURING POLYMER RESIN

This application is the U.S. National Phase under 35. U.S.C. § 371 of International Application PCT/JP2008/066837, filed Sep. 18, 2008. The International Application was published under PCT Article 21(2) in a language other than English.

TECHNICAL FIELD

The present invention relates to an apparatus and a method for manufacturing a polymer resin. Preferably, the present invention relates to a manufacturing apparatus and a manufacturing method used to manufacture a highly transparent resin, such as a styrene-acrylonitrile copolymer resin (SAN) and a methyl methacrylate-styrene copolymer resin (MS) which are copolymer resins.

BACKGROUND ART

Conventionally, a styrene-acrylonitrile copolymer resin (hereinafter occasionally described as "SAN") has been manufactured on an industrial scale. This SAN is manufactured in a continuous manner for reasons of improvement in productivity or the like.

On the other hand, the SAN is manufactured by the copolymerization reaction of styrene and acrylonitrile served as raw materials, and this copolymerization reaction is an exothermic reaction. Accordingly, there arises the need to remove the heat of polymerization, in order to continuously manufacture the SAN in a stable manner. Hence, as an apparatus for manufacturing this SAN, there has been proposed an apparatus including a spatial area within a polymerization vessel whereby the heat of polymerization is removed by evaporating part of a polymerization solution into this spatial area.

Incidentally, this SAN has the characteristic of being superior in transparency. However, this transparency degrades as the SAN becomes cloudy if composition of the SAN, i.e., styrene and acrylonitrile components in the SAN, differ in weight ratio. Accordingly, in order to obtain a SAN superior in transparency, it is necessary to uniformize the composition and temperature of a polymerization solution within the polymerization vessel.

However, in a manufacturing apparatus including a spatial area within a polymerization vessel, as described above, whereby heat is removed as latent heat, the composition of an evaporated monomer, solvent and the like and the composition thereof in a polymerization solution differ from each other. If this vapor is condensed and fed back into the polymerization vessel, there arises a portion where the composition of these components in the polymerization solution differs. In addition, operational factors, such as pressure, temperature and a liquid level, interfere with each other in this apparatus and, therefore, vary constantly. Consequently, a residence time and a polymerization ratio vary, thus making it difficult to keep constant the residence time and the polymerization ratio. As a result, the composition of a SAN produced by copolymerization reaction becomes nonuniform, thereby impairing the transparency of the SAN.

Hence, there has been conventionally proposed a manufacturing apparatus including a cooler whereby the heat of polymerization is removed by the cooler.

Japanese Patent Publication No. 47-610 discloses a manufacturing apparatus including a cooling apparatus within a polymerization vessel whereby the heat of polymerization is removed by the cooling apparatus. This manufacturing apparatus has the characteristic that there is no need to provide a spatial area within the polymerization vessel. Consequently, it is possible to keep constant the residence time of a polymerization solution within the polymerization vessel by keeping constant a raw material feed rate. In addition, the manufacturing apparatus has the advantage that there is no need to consider a change in composition due to the condensation of a vapor component.

Japanese Patent Publication No. 55-35912 discloses an externally-attached heat removal apparatus (cooler) capable of scraping the inner wall of a tube. A cooling medium having the temperature of which is lower than polymerization temperature by 5° C. or more but not more than 40° C., flows through the shell of this heat removal apparatus (cooler). By retrieving the polymerization solution out of a polymerization vessel using a pump and introducing the solution into a tube within this heat removal apparatus, heat exchange is made to take place between the polymerization solution and the cooling medium, thereby cooling the polymerization solution. After this, the polymerization solution is once again fed back into the polymerization vessel to remove the heat of polymerization within the polymerization vessel.

Japanese Patent Publication No. 48-29628 discloses a manufacturing apparatus including a polymerization vessel having in the lower part thereof an auxiliary agitating blade composed of a turbine-type agitating blade and a screw-type agitating blade and having in the inner part thereof a cooler.

DISCLOSURE OF THE INVENTION

However, the manufacturing apparatus disclosed in Japanese Patent Publication Nos. 47-610, 55-35912 and 48-29628, in some cases, fails to fully and uniformly perform the mixing and copolymerization reaction of a raw material and a polymerization solution, resulting in a nonuniform composition of a SAN thus produced.

This means that even if cooling is performed using a cooling apparatus, it is necessary to secure a certain rate of polymerization reaction in order to efficiently manufacture a SAN. For this reason, a polymerization solution within the polymerization vessel is kept at a temperature higher than the temperature of a raw material supplied into the polymerization vessel. Here, as illustrated in FIGS. 1 and 2, a raw material is injected into the polymerization vessel through injection inlets 4 and 10 in the case of the manufacturing apparatus disclosed in Japanese Patent Publication No. 47-610. Accordingly, the temperature and composition of the polymerization solution in some cases becomes nonuniform in the vicinity of these injection inlets 4 and 10, thus causing the composition of a SAN produced to become also nonuniform. In addition, this manufacturing apparatus only includes, as the coolers thereof, a cooling apparatus built in the polymerization vessel and a cooling jacket covering the outer wall of the polymerization vessel. As a result, the manufacturing apparatus has been suffered a shortage of heat removal since a heat transfer area per the unit volume of the polymerization vessel decreases due to an increase in the size of the apparatus. Accordingly, the apparatus of Japanese Patent Publication No. 47-610 has been considered not fully adaptable to an increase in size.

Japanese Patent Publication No. 55-35912 does not specifically disclose any methods for injecting a raw material into the polymerization vessel and mixing and agitating the raw material. Nor does Japanese Patent Publication No. 55-35912 gives consideration to a method for uniformizing the temperature and composition of a polymerization solution in the vicinity of a raw material injection inlet within the polymerization vessel. Furthermore, in a case where the polymerization solution within the polymerization vessel is circulated through an external cooler as in this manufacturing apparatus, the manufacturing apparatus, in some cases, has been affected adversely in such a manner that the agitation axis of an agitation apparatus within the polymerization vessel fluctuates laterally due to the liquid pressure of this circulated polymerization solution when the circulated polymerization solution is fed back into the polymerization vessel.

The manufacturing apparatus of Japanese Patent Publication No. 48-29628 includes auxiliary agitating blade 7 and screw-type agitating blade 3, as illustrated in FIG. 1. Accordingly, it is possible to improve the mixability of raw materials. However, like the manufacturing apparatus of Japanese Patent Publication No. 47-610, this manufacturing apparatus only includes, as the coolers thereof, a cooling apparatus built in the polymerization vessel and a cooling jacket covering the outer wall of the polymerization vessel. Consequently, if the apparatus is directly increased in size, as described above, it is not possible to fully remove the heat of polymerization, thus requiring a cooler to be provided externally.

Furthermore, in the apparatus of Japanese Patent Publication No. 48-29628, the agitation axis itself is elongated if the apparatus is increased in size, and a lateral fluctuation due to the rotation of the agitating blade becomes larger. Hence, in order to prevent this problem, it is necessary to place the agitation axis under control by providing a bearing part in the lower part of the polymerization vessel. However, if the bearing part is provided in the lower part of the polymerization vessel as illustrated in FIG. 1 of Japanese Patent Publication No. 48-29628, it is difficult to install an injection inlet for a raw material and an injection inlet for an externally circulated polymerization solution immediately below the agitating blade. Consequently, in this case, the injection inlets for the raw material and the externally circulated solution have to be installed in position 10 deviated from immediately below the agitating blade within the polymerization vessel, as illustrated in FIG. 2 of Japanese Patent Publication No. 47-610. As a result, it is not possible to uniformly agitate and mix the polymerization solution in the vicinity of inlet 10, thus causing the temperature and composition thereof to become nonuniform. In addition, it is not possible to quickly and uniformly mix the polymerization solution circulated through the external cooler and thereby cooled and the raw material within the polymerization vessel.

As described above, in the conventional manufacturing apparatus, injection inlets for a raw material and an externally circulated solution have to be located away from the agitation axis. Consequently, the apparatus has had the problem that nonuniformity occurs in the temperature and composition of the polymerization solution in the vicinity of an injection inlet for a raw material to be injected into the polymerization vessel and, therefore, a manufactured SAN is inferior in transparency. Furthermore, if the cooling efficiency of the polymerization solution is insufficient and, therefore, an external circulation-type cooler is provided in order to improve the cooling efficiency, the manufacturing apparatus in some cases is adversely affected in such a manner that the agitation axis within the polymerization vessel fluctuates laterally due to the liquid pressure of a polymerization solution having passed through this cooler.

In the Background Art section, an explanation has been made by taking as an example a SAN which is a copolymer resin. However, such a problem as nonuniformity in the temperature and composition of a polymerization solution within a polymerization vessel as seen in the manufacturing process of this SAN, also occurs when continuously manufacturing other polymer and copolymer resins in which a polymerization reaction is an exothermal reaction.

In order to solve the above-described problem, one embodiment relates to an apparatus for manufacturing a polymer resin, comprising:

a polymerization vessel including a main body, and a protruding part which protrudes downwardly from a bottom face of the main body and a lower part of which is composed of a bottom cover;

an agitation apparatus including a driving part installed above the main body, a rotatable agitation axis connected to the driving part and extending from the driving part into the protruding part, and a blade provided on a side face of the agitation axis;

a bearing part provided on the bottom cover of the protruding part so as to cover the side face of the agitation axis without coming into contact therewith in designing and so as to form a gap between the bearing part and the side face of the agitation axis and between the bearing part and a bottom face of the agitation axis;

a solution-retrieving port provided in the main body;

a protection part covering the side face of the agitation axis without coming into contact therewith and forming a first flow path between the protection part and the side face of the agitation axis within the protruding part;

a first cooling means provided within the main body;

a circulating cooling means including a circulating inlet nozzle provided on a side face of the protruding part so as to be opposite to the protection part, a circulation pipeline leading from the main body to the circulating inlet nozzle, and a second cooling means and a circulating pump coupled with the circulation pipeline at a point midway therethrough;

a third cooling means provided so as to cover an outer wall of the polymerization vessel;

a raw material-injecting nozzle coupled with the protruding part; and a flow path-constituting part provided between the bearing part and the protection part so as to cover the side face of the agitation axis and so as to fix the bearing part and the protection part, the flow path-constituting part forming a second flow path between the side face of the agitation axis and the flow path-constituting part and a third flow path for coupling the second flow path with the raw material-injecting nozzle, wherein the first to third flow paths constitute a continuous flow path, an uppermost end of the first flow path is opened to the inside of the protruding part, and the gap, part of the first flow path other than the uppermost end, the second flow path and the third flow path are isolated from the inside of the protruding part.

Another embodiment relates to a polymerization vessel for a polymer resin, comprising:

a main body;

a protruding part protruding downwardly from a bottom face of the main body and including a lower part composed of a bottom cover;

an agitation apparatus including a rotatable agitation axis connected to a driving part installed above the main body and extending from the driving part into the protruding part, and a blade provided on a side face of the agitation axis;

a bearing part provided on the bottom cover of the protruding part so as to cover the side face of the agitation axis without coming into contact therewith and so as to form a gap between the bearing part and the side face of the agitation axis and between the bearing part and a bottom face of the agitation axis;

a solution-retrieving port provided in the main body;

a protection part covering the side face of the agitation axis without coming into contact therewith and forming a first flow path between the protection part and the side face of the agitation axis within the protruding part;

a first cooling means provided within the main body;

a circulating inlet nozzle provided on a side face of the protruding part so as to be opposite to the protection part and so as to flow a cooled polymerization solution therein;

a raw material-injecting nozzle coupled with the protruding part; and a flow path-constituting part provided between the bearing part and the protection part so as to cover the side face of the agitation axis and so as to fix the bearing part and the protection part, the flow path-constituting part forming a second flow path between the side face of the agitation axis and the flow path-constituting part and a third flow path for coupling the second flow path with the raw material-injecting nozzle, wherein the first to third flow paths constitute a continuous flow path, an uppermost end of the first flow path is opened to the inside of the protruding part, and the gap, part of the first flow path other than the uppermost end, the second flow path and the third flow path are isolated from the inside of the protruding part.

The above-described manufacturing apparatus is configured so that a raw material and a polymerization solution circulated by the circulating cooling means are injected into the protruding part. The first to third flow paths constitute a continuous flow path. In addition, the uppermost end of the first flow path is opened to the inside of the protruding part, the gap, part of the first flow path other than the uppermost end, the second flow path and the third flow path are isolated from the inside of the protruding part, thereby constituting an independent space in the protruding part. Accordingly, a raw material newly injected into the protruding part passes through the raw material-injecting nozzle, the third flow path, the second flow path and the first flow path, and is finally injected from the uppermost end of the first flow path into the polymerization vessel.

In general, a monomer as a raw material of a polymer resin and other raw materials are kept at a low temperature, so as not to be polymerized within a monomer storage tank, within an injected raw material adjustment tank, and within a pipeline at any point thereof up to the polymerization vessel. This low-temperature raw material is prevented by the protection part and the flow path-constituting part from coming into contact with a polymerization solution present in the protruding part while flowing from the first flow path to the third flow path, and is in a state of having direct contact with the agitation axis. Here, if there are no such a protection part and a flow path-constituting part as mentioned in the above-described embodiment, the raw material and the polymerization solution which has circulated by way of the second cooling means, are directly mixed with each other immediately after being injected into the protruding part. Consequently, within the protruding part, there arises a portion of the polymerization solution having the composition and temperature which significantly differ from those of a polymerization solution within the main body. In contrast, in the manufacturing apparatus of the above-described embodiment, it is possible to instantaneously and uniformly mix the low-temperature raw material newly injected into the protruding part, a polymerization solution within the polymerization vessel, and a polymerization solution circulated by the circulating cooling means in a small region in the bottom of the polymerization vessel. As a result, it is possible to narrow the composition and temperature distributions of the polymer resin.

In addition, the raw material injected into the protruding part is heated by frictional heat generated by the rotation of the agitation axis at the bearing part, heat transferred from the polymerization solution having circulated within the second cooling means through the protection part, and heat transferred from within the polymerization vessel through the agitation apparatus. Consequently, the raw material is at a certain level of high temperature at the moment of flowing out of the uppermost end of the first flow path into the polymerization vessel. Accordingly, a difference in temperature between the raw material flowing out of the uppermost end of the first flow path and the polymerization solution becomes small. Thus, it is possible to even more uniformly mix and agitate the raw material and the polymerization solution. Furthermore, the heat of the bearing part can be removed by this low-temperature raw material. Consequently, it is possible to prevent the bearing part from becoming so excessively hot as to shorten the service life thereof, and a polymerization reaction from taking place in the vicinity of this part.

The protection part is formed so as to be opposite to the circulating inlet nozzle where the polymerization solution having passed through the second cooling means is injected into the protruding part. Accordingly, it is possible to prevent the agitation axis from fluctuating laterally due to the liquid pressure of the circulated polymerization solution caused when the solution is injected into the protruding part.

As described heretofore, it is possible to cause a polymerization reaction to take place uniformly within the polymerization vessel. Thus, it is possible to manufacture a polymer resin having a uniform composition in a stable manner over a prolonged period of time.

In the present specification, the phrase "raw material" refers to a liquid material containing a monomer as a raw material of a polymer resin, a solvent, a molecular weight modifier, a polymerization initiator as necessary, and the like, and newly injected into a polymerization vessel through a raw material-injecting nozzle.

The phrase "polymerization solution" refers to a mixture of liquid components, among those existent in the polymerization vessel, which have formed into a polymer resin, a monomer as a raw material of a polymer resin, a solvent, a molecular weight modifier, a polymerization initiator as necessary, and the like.

The phrase "inside of the protruding part" refers to a space, among those within the protruding part, surrounded by the outer surface of the protection part, the side face of the agitation axis exposed without being covered by the bearing part, the protection part and the flow path-constituting part, the inner sidewall of the protruding part (excluding the sidewall of the flow path-constituting part), and the flow path-constituting part. That is, the phrase "inside of the protruding part" refers to a space, among those within the protruding part, other than the gap and the first to third flow paths. The space is, for example, part 30 enclosed by a dotted line in FIG. 7.

The phrase "uppermost end of the first flow path" refers to a part, among those of the first flow path, closest to the driving part.

The phrase "internal volume of the polymerization vessel" refers to the volume of a spatial area within the polymerization vessel. That is, the internal volume of the polymerization vessel is expressed as "(volume when the inside of the polymerization vessel is empty and not provided with any means and units)−(volume occupied by means and units provided in the inside of the polymerization vessel)." Examples of this "(means and units provided in the inside of the polymerization vessel)" include the agitation apparatus, the bearing part, the protection part, the first cooling means, and the flow path-constituting part. In addition, if a polymerization solution is loaded into the polymerization vessel, then the "internal volume of the polymerization vessel" corresponds to the volume of the polymerization solution.

Furthermore, the symbol "TL (tangent line)" denotes a boundary between the cylindrical part of the main body of the polymerization vessel and the rounded parts of the corners of a head composing the upper part of the main body. This tangent line is, for example, a portion denoted by a symbol "TL" in FIG. 6.

Figure 1:
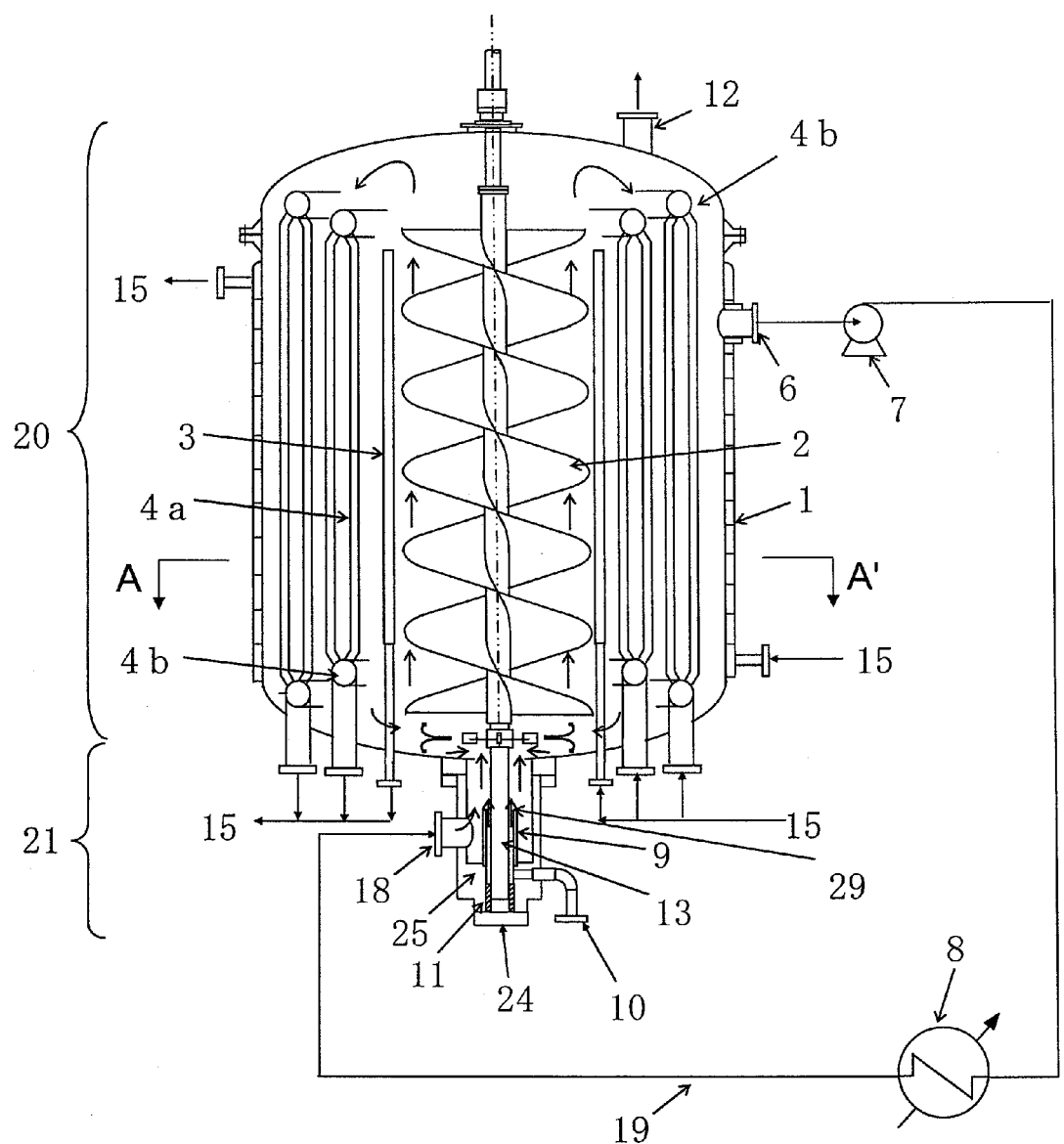
FIG. 1 is a schematic view used to explain the manufacturing apparatus of a first embodiment.

In the drawings, numerals have the following meanings. 1: cooling jacket, 2: blade of agitation apparatus, 3: draft tube, 4a: tubular cooling coil, 4b: annular header, 5: rupture disk, 6: circulating outlet nozzle, 7: circulating pump, 9: protection part, 10, 10a, 10b: raw material-injecting nozzle, 11: bearing part, 12: solution-retrieving port, 13: agitation axis, 15: cooling medium, 18: circulating inlet nozzle, 19: circulation pipeline, 20: main body, 21: protruding part, 22: first flow path, 23: second flow path, 24: bottom cover of protruding part, 25: flow path-constituting part, 26: steady bearing, 27: cylindrical structure, 28: gap, 29: uppermost end of first flow path, 30: inside of protruding part, 31: third flow path.

BEST MODE FOR CARRYING OUT THE INVENTION

Hereinafter, the present invention will be described with reference to embodiments thereof. These embodiments are presented in order to facilitate the understanding of the present invention and, therefore, the present invention is not limited to the embodiments hereinafter described. Accordingly, the present invention includes many alternatives to the below-described embodiments.

Furthermore, in the following, an explanation may be made by taking a SAN as one example of a polymer resin. However, a polymer resin manufactured using a manufacturing apparatus and a manufacturing method according to the present invention is not limited to the SAN. A manufacturing apparatus and a manufacturing method according to the present invention are also applicable to other polymer resins and copolymer resins in which a polymerization reaction is an exothermal reaction.

(First Embodiment)

Figure 2:
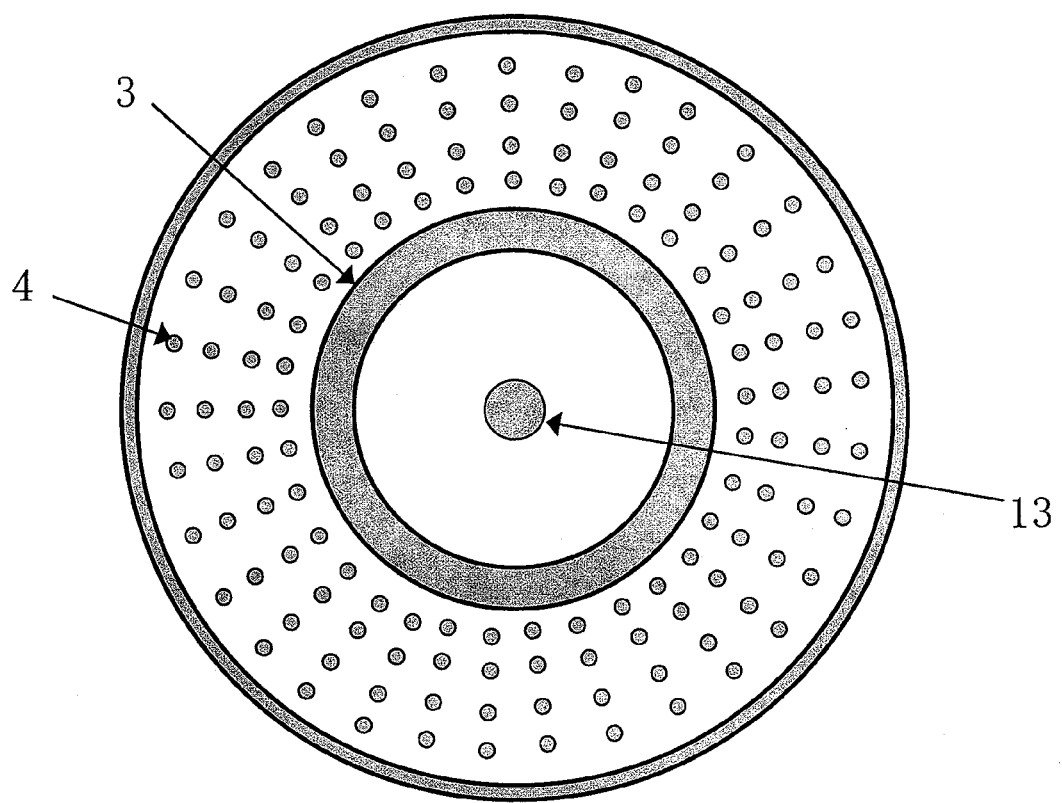
FIG. 2 is another schematic view used to explain the manufacturing apparatus of the first embodiment.

FIGS. 1 and 2 illustrate one example of a manufacturing apparatus according to the present invention. FIG. 1 represents a side cross-sectional view of this manufacturing apparatus and FIG. 2 represents a cross-sectional view taken along the line A-A' of the manufacturing apparatus illustrated in FIG. 1 (FIG. 2 represents only the basic configuration of the manufacturing apparatus illustrated in FIG. 1, and part of the structure thereof is excluded from the figure. In addition, the white area on the black background represents a portion filled with a polymerization solution). This manufacturing apparatus is formed with a polymerization vessel including main body 20 and protruding part 21 protruding downwardly from the bottom face of the main body. The lower part of this protruding part 21 is composed of bottom cover 24.

Above the main body of this polymerization vessel, there is installed an unillustrated driving part. In addition, agitation axis 13 is connected to this driving part. This agitation axis 13 penetrates through main body 20, while being suspended in the air at the upper part thereof, and extends from the driving part into within the lower part of protruding part 21. Blade 2 is welded to the side face of this agitation axis 13. This agitation axis 13 and blade 2 constitute a rotatable agitation apparatus, so that raw materials within the polymerization vessel can be agitated and mixed by the rotation of the agitation apparatus. As illustrated in FIG. 1, an auxiliary agitating blade 17 including an auxiliary blade may be formed in the lower part of this blade 2. By forming the auxiliary agitating blade in this way, it is possible to improve mixing efficiency.

On bottom cover 24 of the protruding part, there is formed bearing part 11 which circumferentially covers the side face of agitation axis 13 without coming into contact therewith. This bearing part 11 is adapted to place agitation axis 13 under control, so as to prevent the agitation axis from fluctuating excessively due to the rotation thereof. In addition, gap 28 (illustrated in FIG. 4) is formed between bearing part 11 and the side face of agitation axis 13 and between bearing part 11 and the bottom face of agitation axis 13.

In the upper part of this main body 20, there is formed solution-retrieving port 12 so that a polymerization solution can be retrieved.

Within protruding part 21, there is formed protection part 9 which circumferentially covers the side face of agitation axis 13 without coming into contact therewith. In addition, a spatial part formed between protection part 9 and the side face of agitation axis 13 constitutes a first flow path.

Within the main body of the polymerization vessel, there are formed draft tube 3, tubular cooling coil 4a, and annular header 4b to which tubular cooling coil 4a is connected, so that the heat of polymerization can be removed. Draft tube 3, tubular cooling coil 4a and annular header 4b correspond to a first cooling means.

This draft tube 3 is, as illustrated in FIGS. 1 and 2, a hollow cylindrical tube. Cooling medium 15 is injected from the lower part of draft tube 3, flows through the inside thereof, and then is drained out of another lower part. Thus, cooling medium 15 circulates through the draft tube. In addition, a blade of the agitation apparatus is formed inward from this draft tube, so as to be surrounded by the draft tube. An upward flow of a polymerization solution occurs in an area inward from the tube and a downward flow of the polymerization solution occurs in an area outward from the tube due to the rotation of the agitation apparatus, thereby efficiently giving rise to a circulating flow within the polymerization vessel.

In FIG. 1, tubular cooling coil 4a is formed in such a manner as to quadruply surround the outside of draft tube 3. Cooling medium 15 injected from the lower parts of annular headers 4b formed in the upper and lower parts of the main body passes through each tubular cooling coil 4a, and then is drained out of the opposite lower parts of annular headers 4*b*. Thus, cooling medium 15 circulates through the tubular cooling coils.

As cooling medium 15 to be used for draft tube 3 and tubular cooling coil 4, it is possible to use a publicly-known medium, including Therminol 55 and Therminol 59 made by Solutia Inc., Dowtherm Q and Dowtherm MX made by The Dow Chemical Company, and NeoSK-Oil 330 and NeoSK-Oil 1400 made by Soken Tecnix Co., Ltd.

As the first cooling means, draft tube 3 may be used solely. In addition, when tubular cooling coil 4*a* is used, one or more circular arrays of tubular cooling coils are installed for a pair of annular headers, and there is no limit in particular to the number of annular headers. Also, in the present embodiment, there are formed two pairs of annular headers and a doubled circular array of tubular cooling coils for each pair of annular headers.

Also, the first cooling means is not limited to draft tube 3 and tubular cooling coil 4*a*. Alternatively, it is possible to use a publicly-known cooler as long as the cooler can stably cool the polymerization solution over a prolonged period of time.

On the side face of protruding part 21, there is formed circulating inlet nozzle 18 so as to be opposite to protection part 9. In addition, circulation pipeline 19 is connected from circulating outlet nozzle 6 of main body 20 to circulating inlet nozzle 18. Second cooling means 8 and circulating pump 7 are connected to this circulation pipeline 19 at points midway therethrough. Circulating inlet nozzle 18, second cooling means 8, circulating pump 7, circulating outlet nozzle 6 provided in main body 20, and circulation pipeline 19 for connecting these components constitute a circulating cooling means. By operating circulating pump 7, a polymerization solution retrieved out of circulating outlet nozzle 6 of main body 20 is returned to protruding part 21 by way of circulating inlet nozzle 18 after being cooled by second cooling means 8.

There is no limit in particular to this second cooling means, as long as the polymerization solution can be continuously cooled with the solution kept flowing. As the second cooling means, it is preferable to use such a heat exchanger as illustrated in FIG. 3, among other heat exchangers, capable of scraping the inner wall of the tube by means of the reciprocal motion of a coil spring.

Figure 3:
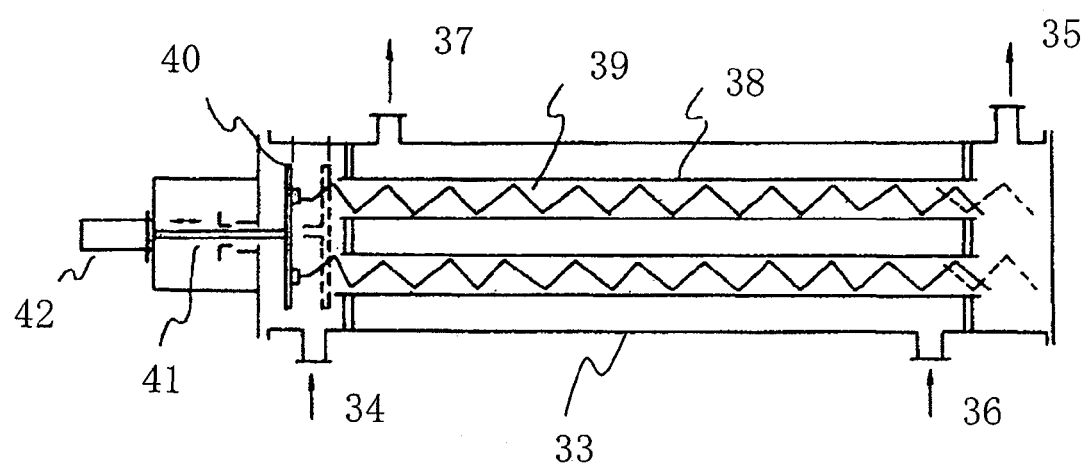
FIG. 3 is a schematic view used to explain a cooler for constituting the second cooling means of the first embodiment.

The heat exchanger illustrated in FIG. 3 includes shell 33 and tube 38 formed therein. This tube 38 is connected to circulation pipeline 19 through inlet 34 and outlet 35, so that a polymerization solution flows through this tube when circulating pump 7 is driven. That is, the polymerization solution enters from inlet 34, passes through tube 38, and then is drained out of outlet 35. In addition, the heat exchanger is configured so that a cooling medium is injected from inlet 36 and is drained out of outlet 37. The cooling medium flowing within this shell 33 and the polymerization solution flowing within tube 38 are separated from each other by a tube sheet, thereby removing the heat of the polymerization solution by means of heat exchange through the tube.

Furthermore, coil spring 39 which makes a reciprocal motion along the inner wall of tube 38 is inserted thereinto and is fixed to panel 40. This panel 40 is connected to rod 41, so as to be externally enabled to make a reciprocal motion continuously or intermittently by reciprocating drive unit 42.

When a polymerization solution is circulated by the circulating cooling means for a long period of time, a solid substance may adhere to the inner wall of the tubes within which the polymerization solution flows. Even if a solid substance adheres to the inner wall of the tube as described above, use of this heat exchanger makes it possible to periodically scrape off the solid substance by the coil spring. As a result, it is possible to cool the polymerization solution stably and constantly.

In FIG. 3, a case is shown in which the coil spring makes a reciprocal motion. However, the movement of the coil spring is not limited to this motion. Alternatively, the heat exchanger may be configured so that rod 31 and reciprocating drive unit 32 are formed for each coil spring and each coil spring can rotate independently. In addition, as the cooling medium to be flowed within shell 33, it is possible to use one of the publicly-known heat mediums mentioned above.

Third cooling means 1 is formed so as to cover the outer wall of the polymerization vessel. As this third cooling means 1, it is possible to use, for example, a cooling jacket.

Raw material-injecting nozzle 10 is connected to protruding part 21, so that a raw material is newly injected into the polymerization vessel. In addition, this monomer as a raw material of a polymer resin and other raw materials are usually kept at a low temperature, so as not to be polymerized within a storage tank or within a pipeline at any point thereof up to the polymerization vessel. Use of such a low-temperature raw material increases a ratio at which the heat of polymerization can be removed using the sensible heat of the raw materials. Thus, it is possible to reduce the load of the first cooling means, second cooling means and third cooling means.

Between bearing part 11 and protection part 9, there is formed a second flow path, so as to circumferentially cover the side face of agitation axis 13 by flow path-constituting part 25. In addition, this flow path-constituting part 25 connects bearing part 11, protection part 9 and raw material-injecting nozzle 10. Flow path-constituting part 25 forms third flow path 31 for coupling the second flow path with the raw material-injecting nozzle.

This flow path-constituting part 25 needs to be formed at least between bearing part 11 and protection part 9, so as to cover agitation axis 13. However, flow path-constituting part 25 may exist not only in an area between bearing part 11 and protection part 9 but also in an area upward further from this area (toward the driving part side). In this case, part of flow path-constituting part 25 (portion above the area between bearing part 11 and protection part 9) covers the lower part of protection part 9, as illustrated in, for example, FIGS. 4 and 5.

These first to third flow paths constitute a continuous flow path. In addition, uppermost end 29 of the first flow path is opened to the inside of the protruding part, and the gap, part of the first flow path other than the uppermost end, the second flow path and the third flow path are isolated from the inside of the protruding part. Accordingly, the gap, part of the first flow path other than the uppermost end, the second flow path and the third flow path constitute a separate space formed solely of these parts in the protruding part. Consequently, a section ranging from raw material-injecting nozzle 10 to the first flow path (raw material-injecting nozzle 10—third flow path 31—second flow path 23—first flow path 21) is adapted to prevent an injected low-temperature raw material from leaking out of any point along the section and from coming into contact with a polymerization solution within the polymerization vessel. In addition, this raw material-injecting nozzle 10 is connected to the first flow path through the third and second flow paths. Consequently, the low-temperature raw material injected from raw material-injecting nozzle 10 passes through third flow path 31, second flow path 23 and first flow path 21, without coming into contact with the polymerization solution. Finally, the raw material is drained out of uppermost end (space between the uppermost end of the protection part and the side face of the agitation axis) 29 of first flow path 21 to a location within the protruding part near the upper part thereof.

In this way, the raw material newly injected into the polymerization vessel is guided to an agitation apparatus formed in the main body, and is promptly and uniformly mixed with the polymerization solution within the polymerization vessel. After this, as shown by arrows in FIG. 1, the polymerization solution is caused by the rotation of the agitation apparatus to go up in a region of the main body closer to the center thereof than the draft tube, go down in a region farther from the center than the draft tube, and return to the bottom of the main body. In this way, the raw material is circulated and mixed within the main body. A polymerization reaction takes place while the polymerization solution is being circulated and mixed as described above, and thus a polymer resin is manufactured.

In addition, part of the polymerization solution containing the polymer resin thus manufactured is retrieved out of solution-retrieving port 12 formed in the upper part of the main body. Then, an unreacted monomer, a solvent and the polymer resin are separated from the retrieved polymerization solution using a thin-film evaporator, an extruder, such a shell-and-tube type heat exchanger as described in Japanese Patent Publication No. 48-29797, a gas-liquid separator (none of which is illustrated in FIG. 1), and the like. And then the polymer resin is pelletized into a product. After the unreacted monomer and the solvent are retrieved, a raw material is further added thereto so that the mixture thus obtained has a predetermined composition, thus the unreacted monomer and the solvent are once again used as raw materials.

Figure 4:
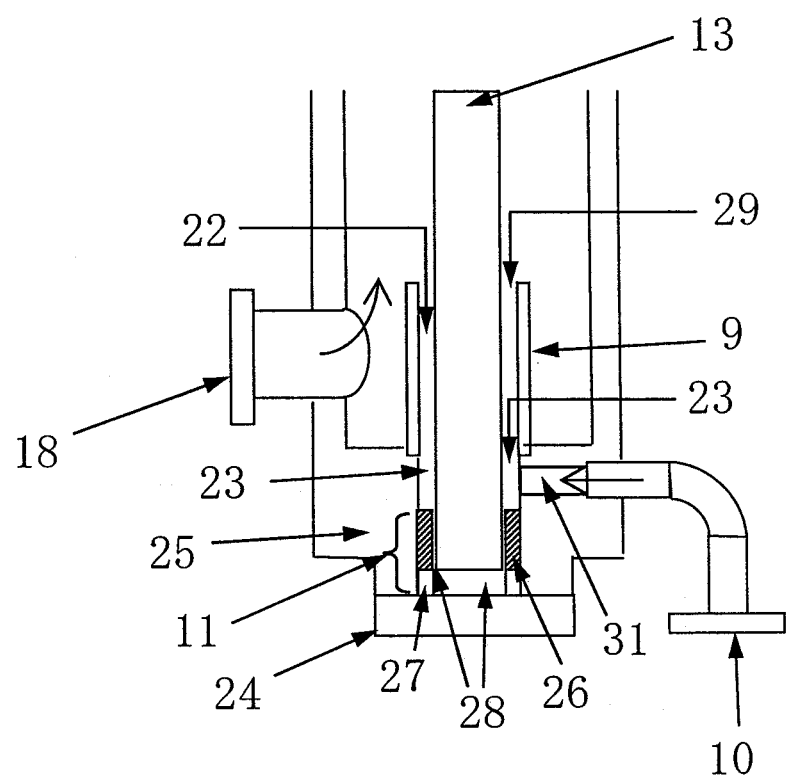
FIG. 4 is a schematic view used to explain one example of a protruding part.

FIG. 4 illustrates one example of protruding part, protection part, and first to third flow paths of the manufacturing apparatus. As illustrated in FIG. 4, bearing part 11 is formed on bottom cover 24 of a protruding part. In addition, agitation axis 13 is placed under control by bearing part 11, so as not to fluctuate horizontally. The upper and lower parts of this bearing part 11 are respectively composed of steady bearing 26 and cylindrical structure 27 for supporting the steady bearing. Both the steady bearing and the cylindrical structure are formed so as to circumferentially cover the side face of agitation axis 13, preferably without coming into contact therewith. The structure of bearing part 11 is not limited to the structure illustrated in FIG. 4. Alternatively, steady bearing 26 and cylindrical structure 27 may have a structure whereby the steady bearing and the cylindrical structure are fixed to a flow path-constituting part by a key and a key groove so as not to rotate.

Although placed under control by steady bearing 26 so as not to fluctuate laterally, as described above, agitation axis 13 is connected to the driving part while being suspended in the air. Accordingly, there is a space between agitation axis 13 and bottom cover 24 of the protruding part. Thus, the manufacturing apparatus is designed so that adequate spaces are formed between the side face of agitation axis 13 and steady bearing 26 and between the side face of agitation axis 13 and cylindrical structure 27. That is, gap 28 is formed between the side face of agitation axis 13 and bearing part 11 and between the bottom face of agitation axis 13 and bearing part 11. Preferably, the manufacturing apparatus is designed so as to normally have a gap of 0.1 mm or larger but not larger than 1 mm between the side face of agitation axis 13 and bearing part 11, so that agitation axis 13 can rotate freely. In addition, by forming gap 28 in this way, it is possible to prevent agitation axis 13 from coming into contact with bearing part 11 and bottom cover 24 of the protruding part even if the agitation axis expands due to heat within the polymerization vessel.

This steady bearing 26 is made of a material softer than that of agitation axis 13 and, therefore, may be abraded by the rotation of agitation axis 13. In anticipation of such a case, the manufacturing apparatus may be configured so that part of the protruding part is detachable to enable steady bearing 26 to be replaced as appropriate.

In addition, a protective cap, though not illustrated in FIG. 4, may be provided in a part of agitation axis 13 opposite to steady bearing 26, in order to protect agitation axis 13. By forming the protective cap in this way, it is possible to prevent agitation axis 13 from being damaged even if foreign matter gets in between steady bearing 26 and agitation axis 13.

Within protruding part 21, there is formed protection part 9 so as to circumferentially surround the side face of agitation axis 13. Since this protection part 9 and the side face of agitation axis 13 are away from each other without having contact with each other, there is a spatial part between protection part 9 and the side face of agitation axis 13. This spatial part serves as first flow path 22.

As a material for the protection part, it is possible to use, for example, stainless steel. The wall thickness of the protection part may only be as large as to have such strength as to prevent the protection part from being bended by the liquid pressure of a circulating polymerization solution. Accordingly, the wall thickness can be determined as appropriate, according to the flow velocity of a circulating inlet nozzle. This protection part may be structured so that at least part of the lower part of the protection part is threaded in such a direction as to prevent the protection part from being loosened by the rotational force of a solution caused by the rotation of the agitation axis, and then fixed to the flow path-constituting part.

In the present embodiment, an example has been shown in which one circulating pump, one cooler, one circulating outlet nozzles and one circulating inlet nozzle are respectively grouped into one set. However, each of the groups of circulating pumps, coolers, circulating outlet nozzles and circulating inlet nozzles is not limited to one set, but may be installed in two or more. The raw material-injecting nozzles may also be installed in two or more pairs. In this case, the flow path-constituting part and the third flow path are formed so as to be consistent with the number of raw material-injecting inlet nozzles and the position thereof.

Figure 5:
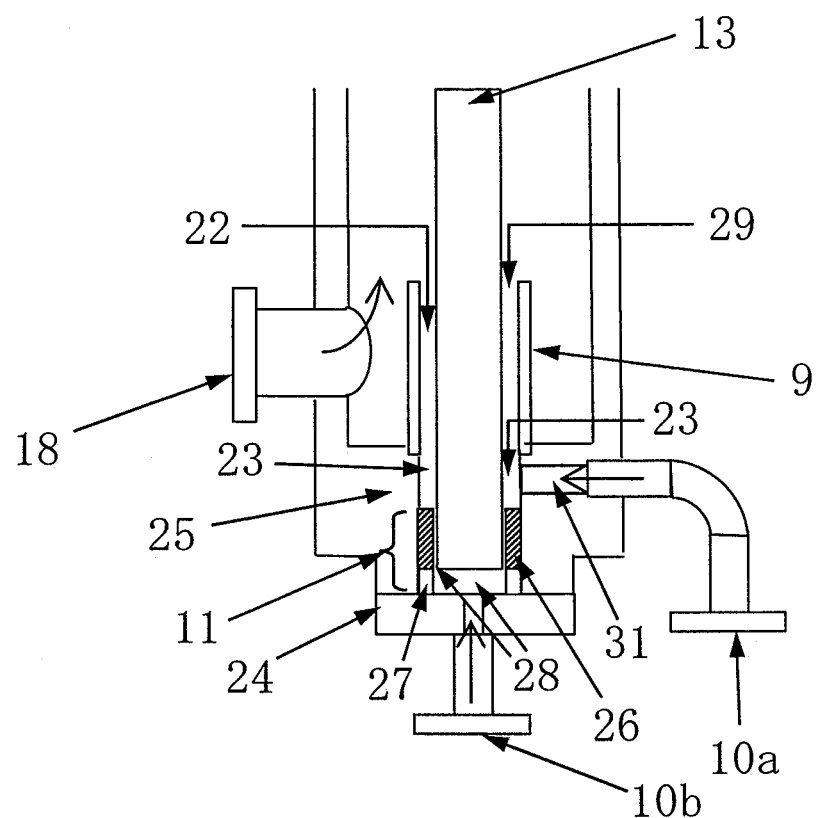
FIG. 5 is another schematic view used to explain one example of the protruding part.

Furthermore, as a modified example of the embodiment illustrated in FIG. 4, another raw material-injecting nozzle 10b may further be formed below the bottom cover of the protruding part, as illustrated in FIG. 5, so that a raw material can be injected from this raw material-injecting nozzle 10b. The raw material injected from this raw material-injecting nozzle 10b into the lower part of the protruding part passes through gap 28 between the bottom face of agitation axis 13 and bottom cover 24—gap 28 between the side face of agitation axis 13 and bearing part 11—second flow path 23—first flow path 22, in this order. Then, the raw material passes through first flow path 22, after being merged with a raw material injected from pipeline 10a in this second flow path 23, and is drained out of uppermost end 29 thereof to the upper part of the protruding part. With such a configuration as described above, it is possible to further enhance the cooling effect of the bearing part.

Here, the raw materials injected from raw material-injecting nozzles 10a and 10b contain a monomer as a raw material of a polymer resin, a solvent, a molecular weight modifier, a polymerization initiator as necessary, and the like. In addition, the raw materials are kept at a low temperature so that a polymerization reaction does not take place within an injected raw material adjustment tank and within a pipeline at any point thereof up to the polymerization vessel.

In such manufacturing apparatus of the present embodiment as illustrated in FIGS. 4 and 5, a raw material injected from raw material-injecting nozzle 10, 10a or 10b passes through third flow path 31, second flow path 23 and first flow path 22 because of the above-described configuration. In addition, the gap, parts of the first flow path other than the uppermost end, the second flow path and third flow path are isolated from the inside of the protruding part and these parts constitute an independent, inherent space in the protruding part. Furthermore, only uppermost end 29 of the first flow path is opened to the inside of the protruding part. Accordingly, a low-temperature raw material injected into the polymerization vessel is prevented by flow path-constituting part 25 of the protruding part and protection part 9 from coming into contact with a polymerization solution present in protruding part 21 while flowing through third flow path 31, second flow path 23 and first flow path 22, and is in a state of having direct contact with agitation axis 13. This means that the low-temperature raw material is present in an area near bearing part 11, thereby enabling the removal of the heat of bearing part 11. Therefore, it is possible to prevent a monomer from being polymerized in the vicinity of this area. In addition, with the low-temperature raw material, it is possible to remove frictional heat generated by the rotation of agitation axis 13 between the raw material and steady bearing 26. Thus, it is possible to reduce the abrasion of steady bearing 26 and extend the service life thereof.

The raw material, while passing through the first to third flow paths, is heated by frictional heat generated by the rotation of agitation axis 13 between the raw material and bearing part 11, heat transferred from the polymerization solution having circulated within the second cooling means through the protection part, and heat transferred from within the polymerization vessel through an agitator. Consequently, the raw material is at a certain level of high temperature at the moment of flowing out of uppermost end 29 of first flow path 22 into the polymerization vessel. Accordingly, a difference in temperature between the raw material flowing out of uppermost end 29 of first flow path 22 and the polymerization solution becomes small. Thus, it is possible to even more uniformly mix and agitate the raw material and the polymerization solution.

In addition, the protection part is formed so as to be opposite to the circulating inlet nozzle which is a part where a polymerization solution having gone through the second cooling means is injected into the protruding part. Consequently, it is possible to prevent the agitation axis from fluctuating laterally due to the liquid pressure of the circulated polymerization solution caused when the solution is injected into the protruding part. Therefore, it is possible to increase the flow rate of circulation by forming the protection part.

As described heretofore, in the present embodiment, it is possible to instantaneously and uniformly mix the low-temperature raw material newly injected into the protruding part, a polymerization solution within the polymerization vessel, and a polymerization solution circulated by the circulating cooling means in a small region in the bottom of the polymerization vessel. As a result, it is possible to narrow the composition and temperature distributions of the polymer resin.

In contrast, if there is no such protection part as described in the present embodiment, the polymerization solution having gone through the second cooling means and the raw material are mixed immediately after being injected into the protruding part. Consequently, within the protruding part, there arises a part of the polymerization solution the composition and temperature of which significantly differ from those of a polymerization solution within the main body. In addition, a high-temperature polymerization solution enters the bearing part and this part therefore, becomes even hotter due to frictional heat, thus a polymer resin whose composition significantly differs from that of a polymer resin within the main body is produced. Furthermore, the service life of the steady bearing shortens. If the flow rate of circulation of the polymerization solution by the circulating cooling means is increased in order to improve the cooling efficiency of the polymerization solution, the polymerization solution is pushed out of circulating inlet nozzle 18 into protruding part 21 by a high liquid pressure. Accordingly, agitation axis 13 tends to fluctuate laterally due to this liquid pressure.

The temperature of the polymerization solution within the polymerization vessel can be set as appropriate, according to the type of resin to be manufactured. For example, a case is taken as an example in which a styrene-acrylonitrile copolymer resin (SAN), which is a copolymer resin, is manufactured as a polymer resin. In this case, the temperature is preferably 120° C. or higher but not higher than 190° C. and, more preferably, 125° C. or higher but not higher than 170° C., if an initiator is not used. With the temperature of the polymerization solution within the polymerization vessel being within these ranges, it is possible to effectively let a copolymerization reaction take place for the manufacture of the SAN.

The temperature of a polymerization solution returned by the circulating cooling means to the protruding part is preferably lower than the temperature of the polymerization solution within the polymerization vessel by 2° C. or higher but not higher than 10° C. and, more preferably, by 2° C. or higher but not higher than 5° C., immediately before the polymerization solution is returned to the protruding part. With the temperature of the polymerization solution to be returned to the protruding part being within these ranges, it is possible to effectively remove the heat of polymerization while decreasing a difference in temperature between the returned polymerization solution and the polymerization solution within the polymerization vessel. In addition, it is preferable that a cooling medium having the temperature lower than a polymerization temperature by 5° C. or higher but not higher than 40° C., is flowed through this second cooling means.

When injecting raw materials from two raw material-injecting nozzles 10a and 10b, these raw materials injected through nozzles may be the same with each other or may be different from each other. For example, when manufacturing a styrene-acrylonitrile copolymer resin (SAN) as a polymer resin, styrene may be injected from one raw material-injecting nozzle and acrylonitrile may be injected from the other raw material-injecting nozzle.

The first cooling means preferably includes a draft tube which is formed so as to surround the blade of the agitation apparatus and within which a cooling medium is flowed, a tubular cooling coil formed between the draft tube and the inner wall of the main body, and annular headers formed in the upper and lower parts of the polymerization vessel so as to flow a cooling medium through the tubular cooling coil. As a third cooling means, it is preferable to use a cooling jacket. In addition, A/B is preferably 6 $m^2/m^3$ or greater but not greater than 25 $m^2/m^3$, where A ($m^2$) is the "sum of the external surface areas of the draft tube, tubular cooling coil and annular headers within the main body and the area of the outer wall of the main body covered with the cooling jacket," and B($m^3$) is the "internal volume of the polymerization vessel." In addition, the phrase "external surface areas of the draft tube, tubular cooling coil and annular headers" refers to the surface areas of parts of external surfaces of the draft tube, tubular cooling coil and annular headers which exist within the polymerization vessel.

With A/B being 6 m²/m³ or greater, cooling efficiency increases and, therefore, it is possible to uniformize the temperature of the polymerization solution and therefore the composition of the polymer resin. In addition, setting A/B to 25 m²/m³ or smaller prevents an interval between cooling pipes from decreasing, thereby causing the flow of the polymerization solution to become uneven, or prevents agitation power from increasing, thereby causing agitation heat to increase. As a result, it is possible to attain excellent cooling efficiency and achieve cost reductions.

The polymerization apparatus preferably includes the above-described draft tube, tubular cooling coil and annular headers as the first cooling means and preferably uses a cooling jacket as the third cooling means. In addition, as the second cooling means, it is preferable to use a cooler including a shell in which a cooling medium flows, a tube connected to a circulation pipeline and formed within the shell, and a coil spring formed within the tube of the cooler and capable of at least one of reciprocal motion and rotational motion. In this case, A/C is preferably 0.2 or greater but not greater than 1.0, where A (m²) is the "sum of the external surface areas of the draft tube, tubular cooling coil and annular headers within the main body and the area of the outer wall of the main body covered with the cooling jacket," and C (m²) is the "internal surface area of the tube of the cooler." In addition, the phrase "external surface of the draft tube, tubular cooling coil and annular headers" refers to the surface areas of parts of external surfaces of the draft tube, tubular cooling coil and annular headers which exist within the polymerization vessel.

If A/C is smaller than 0.2, the ratio of heat removal by the second cooling means increases. Consequently, if a circulating volume is not increased, the temperature of a polymerization solution circulated through the second cooling means becomes excessively lower than the internal temperature of the polymerization vessel, thus possibly degrading the uniformity of resin composition within the polymerization vessel. In addition, if the circulating volume is increased, there arises the need to increase the strength of the protection part and the main body of apparatus, in order to counterbalance an increase in the agitation power or an increase in the liquid pressure of the second cooling means. This may degrade the economics of the apparatus as a whole.

On the other hand, if A/C is greater than 1.0, the ratio of heat removal by the first cooling means and the third cooling means becomes extremely higher, compared with the ratio of heat removal by the second cooling means. As a result, the cooling efficiency of the first and third cooling means may degrade due to a solid substance which adheres to the surfaces of these means with the lapse of continuous operating time. Consequently, it may be no longer possible to continue long-term operation.

In addition, if a distance from the fixed position of the protection part to the circulating inlet nozzle is too long, the protection part tends to become bent due to the liquid pressure of a circulating solution. It is therefore preferable to shorten a distance from the fixed end of the protection part to the intersecting point of the central line of the circulating inlet nozzle and the protection part (distance from the fixed end of the protection part to a portion of the protection part which receives the liquid pressure). Furthermore, the uppermost end of the protection part is preferably positioned upper than the uppermost end of the inner wall of the circulating inlet nozzle and lower than the lowermost end of the bottom face of the main body. With the uppermost end of the protection part being positioned upper than the uppermost end of the inner wall of the circulating inlet nozzle, the protection part is positioned so as to be opposite to the circulating inlet nozzle. Accordingly, it is possible to prevent the agitation axis from being fluctuated laterally by the liquid pressure of a polymerization solution circulated through the circulating inlet nozzle. In addition, with the uppermost end of the protection part being positioned lower than the bottom face of the main body, a raw material passes through the uppermost end of the first flow path and is drained to an area near the upper part of the protruding part within the polymerization vessel, so as to be first mixed with a polymerization solution in this area. A blade and an auxiliary agitating blade are formed within a narrow space in this area, so that at this time, the raw material and the polymerization solution are mixed and agitated at a high shear velocity. Consequently, it is possible to more effectively let the raw material and the polymerization solution mix with each other and undergo polymerization reaction.

Assuming the inner diameter of the circulating inlet nozzle to be $D_N$, then the uppermost end of the protection part is preferably positioned 0.5 $D_N$ or more upper than the uppermost end of the inner wall of the circulating inlet nozzle. With the uppermost end of the protection part being positioned at this height, a liquid pressure on the agitation axis is reliably reduced. In addition, it is possible to effectively let the raw material and the polymerization solution to undergo mixing, agitation and polymerization reaction.

(Second Embodiment)

Figure 6:
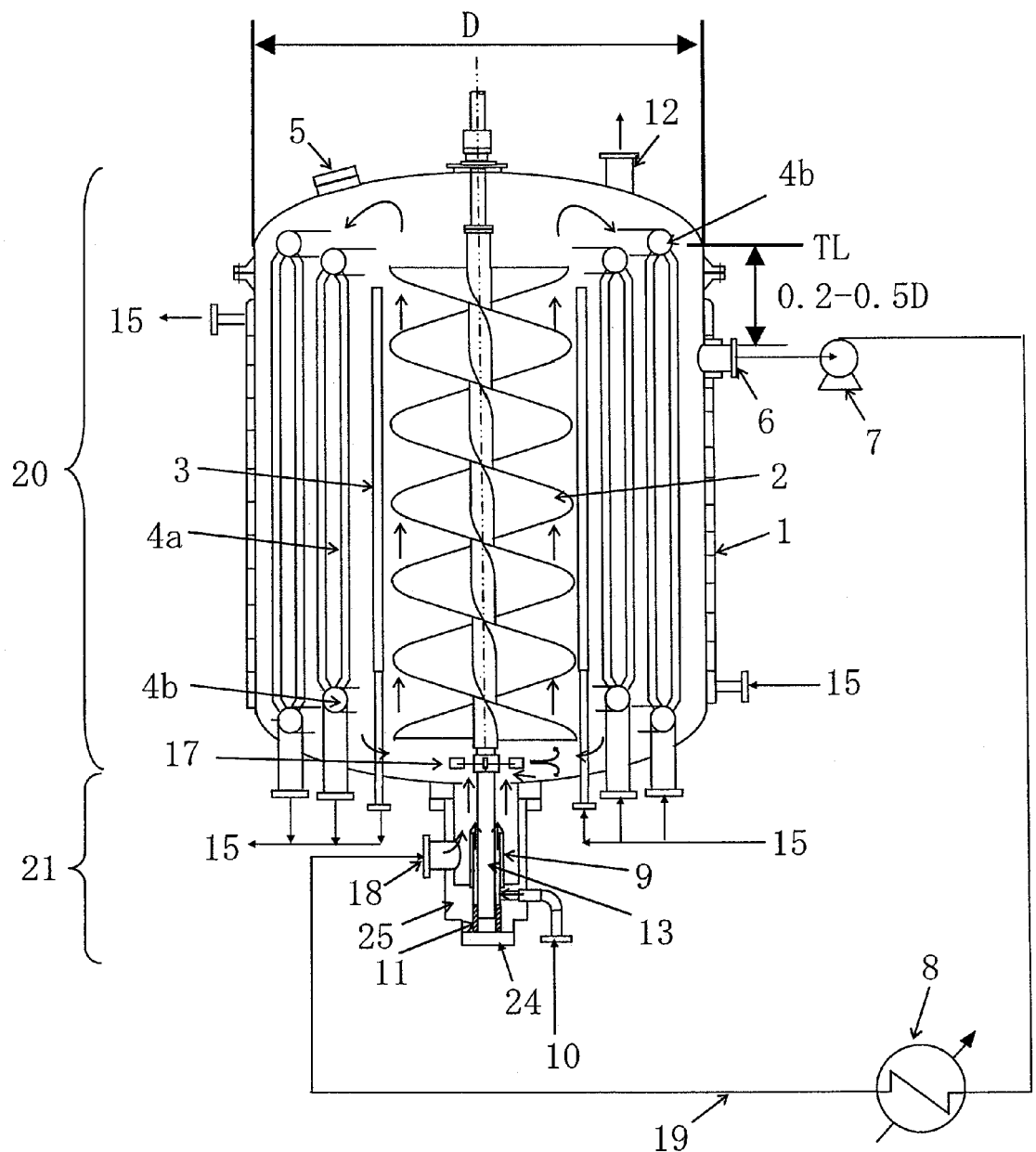
FIG. 6 is a schematic view used to explain the manufacturing apparatus of a second embodiment.
Figure 7:
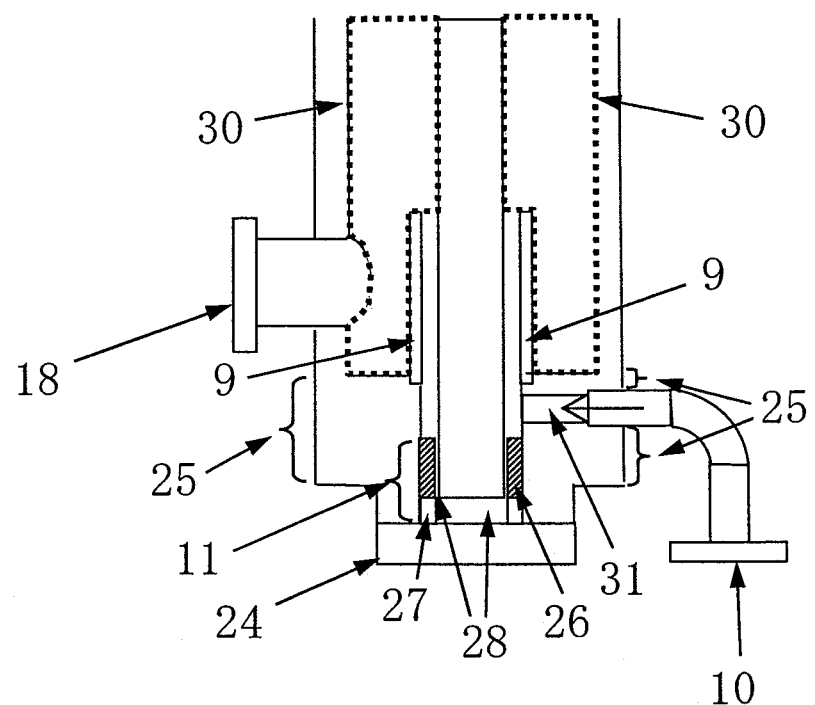
FIG. 7 is a schematic view used to explain the inside of a protruding part within the manufacturing apparatus.

The present embodiment relates to a pressure-releasing part for runaway polymerization reaction within a polymerization vessel. FIG. 6 illustrates one example of this manufacturing apparatus. In the present embodiment, unlike the first embodiment, the manufacturing apparatus includes rupture disk 5 in the upper part of main body 20 as a pressure-releasing part to be opened so as to depressurize the inside of the polymerization vessel when the internal pressure of the polymerization vessel is or exceeds a predetermined pressure. A nozzle and a depressurization apparatus, such as a remote-operated valve, may be formed as the pressure-releasing part in place of rupture disk 5. In addition, circulation pipeline 19 is connected to the side face of main body 20, and a height between the tangent line (TL) of main body 20 and the uppermost end of the inner wall of circulation pipeline 19 is 0.2 D or greater but not greater than 0.5 D, assuming the inner diameter of the cylindrical part of main body 20 to be "D".

Rupture disk 5 is formed in this way and is connected further to a vessel (not illustrated in FIG. 6) maintained at a pressure lower than that of the polymerization vessel. Accordingly, if a polymerization reaction within the polymerization vessel runs out of control and the internal pressure of the polymerization vessel becomes excessively high, rupture disk 5 ruptures to release the inside of the polymerization vessel. Thus, it is possible to depressurize the inside of the polymerization vessel. As a result, it is possible to prevent the internal pressure and temperature inside the polymerization vessel from becoming so excessively high as to break the polymerization vessel.

Furthermore, if rupture disk 5 ruptures as described above, so as to depressurize the inside of the polymerization vessel, part of the polymerization solution evaporates and blows out of a system, thus giving rise to a space within main body 20. If at this time, circulating outlet nozzle 6 is connected to the side face of main body 20 at an upper position thereof, a circulating pump draws in a gas in the upper part of the main body and runs into idle operation, thus possibly failing to operate properly.

On the other hand, if circulating outlet nozzle 6 is connected to the side face of main body 20 at a lower position thereof, the circulating pump causes a polymerization solution near the bottom of main body 20 to circulate, though the circulating pump does not run into idle operation. This polymerization solution near the bottom of main body 20 has been already cooled by a tubular cooling coil and is, therefore, at a low temperature. Accordingly, the relatively-low-temperature polymerization solution is further cooled by the second cooling means, thus causing an even lower-temperature polymerization solution to be returned to the polymerization vessel. Consequently, the temperature distribution of a polymerization solution within the polymerization vessel broadens. As a result, the composition of a polymer resin manufactured within the polymerization vessel becomes nonuniform.

In contrast, in the present embodiment, a height between the TL of main body 20 and the uppermost end of the inner wall of circulating outlet nozzle 6 is 0.2 D or greater but not greater than 0.5 D. In addition, circulating outlet nozzle 6 is connected to the side face of main body 20 at an appropriate height.

Consequently, even if a polymerization reaction runs out of control and rupture disk 5 ruptures, circulating pump 7 does not run into idle operation. In addition, it is possible to approximate the cooler outlet temperature of a polymerization solution circulated by the circulating cooling means as close as possible to the internal temperature of the polymerization vessel. Consequently, it is possible to narrow the temperature distribution of a polymerization solution within the polymerization vessel, and uniformize the composition of a polymer resin.

A level switch may be installed on the inner wall of the polymerization vessel, so that it is possible to determine at which level the polymerization solution is when rupture disk 5 ruptures.

(Third Embodiment)

The third embodiment shows one example in which a copolymer resin is used as a polymer resin. Many of copolymer resins feature rapid copolymerization reaction and high reaction heat. Thus, the copolymer resins have the characteristic that the internal temperature of the polymerization vessel tends to become high, and a temperature distribution within the polymerization vessel tends to become nonuniform. Accordingly, by using the manufacturing apparatus in accordance with the present invention, it is possible to remove the heat of polymerization generated by the reaction heat of the copolymerization reaction within the polymerization vessel and uniformly control the internal temperature of the polymerization vessel to within a desired temperature range. In addition, by injecting a low-temperature raw material for copolymer resin into the protruding part, it is possible to maintain the bearing part and the agitation axis at a low temperature. As a result, it is possible to continuously and uniformly manufacture a copolymer resin having a uniform composition. In addition, it is possible to reduce the abrasion of the steady bearing, as well as it is possible to prevent a monomer from being polymerized at the bearing part and in the vicinity thereof.

As this copolymer resin, it is preferable to manufacture a styrene-acrylonitrile copolymer resin (SAN). The styrene-acrylonitrile copolymer resin (SAN), among other copolymer resins, has the characteristics that a reaction rate is high, polymerization heat is high, and transparency degrades if the resin composition is nonuniform. Hence, by using the manufacturing apparatus according to the present invention, it is possible to effectively remove reaction heat due to copolymerization reaction. Thus, it is possible to effectively and stably control the internal temperature of the polymerization vessel within a desired temperature range. As a result, it is possible to manufacture a SAN having a uniform composition and excellent transparency, as well as prevent the abrasion and the like of the bearing part.

In items (1) to (4) listed below, there are mentioned conditions preferred when manufacturing the styrene-acrylonitrile copolymer resin (SAN) as a polymer resin.

(1) The acrylonitrile component of the SAN to be manufactured becomes higher in ratio as the acrylonitrile content of a raw material injected by raw material-injecting nozzle 10 becomes higher. Here, the ratio of the acrylonitrile component of the SAN to be manufactured is preferably 15% by weight or higher but not higher than 35% by weight, and the styrene content is preferably 65% by weight or higher but not higher than 85% by weight. Accordingly, it is preferable that the weight ratio "acrylonitrile/(acrylonitrile+styrene)" in the raw material is 0.15 or higher but not higher than 0.5, so that the SAN has such a composition as described above.

(2) In addition, the solvent content of a raw material injected by raw material-injecting nozzle 10 is preferably 5% by weight or higher but not higher than 30% by weight. The solvent is used to reduce agitation power and regulate the rate of polymerization reaction. With the solvent content of the raw material being within these ranges, it is possible to manufacture the SAN stably and with high productivity. As type of this solvent, it is possible to use an aromatic hydrocarbon compound such as benzene, toluene and ethyl benzene and so on.

(3) Furthermore, as a molecular weight modifier, it is possible to let a raw material to be injected by raw material-injecting nozzle 10 contain a sulfuric compound, such as tertiary dodecyl mercaptan and the like, at a concentration of 100 ppm or higher but not higher than 8000 ppm. Organic peroxide, for example, benzoyl peroxide, lauroyl peroxide, acetyl peroxide or the like may be contained in the raw material as an initiator on a case-by-case basis.

(4) As polymerization conditions when an initiator is not used, the temperature is preferably 120° C. or higher but not higher than 170° C. and the residence time is preferably 1 hour or longer but no longer than 3 hours. As polymerization conditions when an initiator is used, the temperature is preferably 70° C. or higher but not higher than 125° C. and the residence time is preferably 1 hour or longer but no longer than 3 hours.

(Fourth Embodiment)

The present embodiment relates to a manufacturing method using an apparatus for manufacturing a SAN. The present embodiment includes the following steps:

(1) a step of preparing a polymerization vessel loaded with a polymerization solution;

(2) a step of injecting a raw material from a raw material-injecting nozzle through a third flow path, a second flow path and a first flow path into a protruding part;

(3) a step of performing a polymerization reaction in which a polymer resin is formed while mixing the raw material with a polymerization solution by rotating an agitation apparatus;

(4) a step of cooling a polymerization solution within the polymerization vessel by first and third cooling means;

(5) a step of retrieving the polymerization solution from the main body using a circulating pump, cooling the polymerization solution by second cooling means, and then returning the polymerization solution to the protruding part through a circulating inlet nozzle; and (6) a step of retrieving the polymerization solution from the solution-retrieving port and then separating a polymer resin from the polymerization solution.

In the above-described manufacturing method, steps (1) to (6) may not necessarily be carried out in sequence. Alternatively, some or all of the steps may be carried out concurrently.

Here, the volumetric flow rate of a polymerization solution circulating within the main body is preferably 50 times or more but not more than 300 times and, more preferably, 80 times or more but not more than 200 times the volumetric flow rate of a raw material injected from the raw material-injecting nozzle.

Here, the "volumetric flow rate of a polymerization solution circulating within the main body" can be measured using a particle tracking method. That is, a syrupy solution or silicone oil having the same viscosity as that of the polymerization solution is put in an acrylic vessel having the same in structure and size as the polymerization vessel, and is agitated using the agitation apparatus, with the injection of a new raw material and the drainage of the polymerization solution stopped. Next, a tracer particle, such as a spherical particle approximately 2 mm to 3 mm in diameter of a colored vinyl chloride resin, polystyrene resin or ABS resin, the difference in density of which from the polymerization solution is no larger than approximately 5%, is put in the polymerization vessel. Next, a determination is made as to how many times the tracer particle circulates within the polymerization vessel in a unit time (per hour). Then, the "volumetric flow rate of a polymerization solution circulating within the main body" is calculated on the basis of the number of times the tracer particle circulates within the polymerization vessel.

For example, if the tracer particle circulates within polymerization vessel "A" times per hour and the volume of the polymerization solution within the polymerization vessel is "V" ($m^3$), and then the "volumetric flow rate of a polymerization solution circulating within the main body" is A×V ($m^3/h$). Accordingly, using the formula A×V/Q, it is possible to calculate how many times the volume of the polymerization solution circulating within the polymerization vessel is as large as the volumetric flow rate of a raw material injected from the raw material-injecting nozzle, assuming the flow rate of the newly injected raw material to be Q ($m^3/h$). The spherical tracer particle can be obtained by putting a raw material resin, a pigment and the like in an extruder and pelletizing them using an underwater cutter method.

The viscosity of the polymerization solution can be determined by, for example, (a) evaluating the pressure loss at the discharge line of a circulating pump or at the exit line of a polymerization solution and calculating the viscosity from the Hagen-Poiseuille formula, or (b) installing a vibration-type viscometer or the like within the polymerization vessel or in the exit line thereof.

Heat transfer performance upgrades with an increase in the flow rate of a polymerization solution passing through the second cooling means and, therefore, the exit temperature of the polymerization solution also increases. Consequently, it is possible to obtain a polymer superior in transparency. On the other hand, the capacity of the circulating pump increases and, therefore, the increase in the power or strength of a scraping apparatus grows is necessary, resulting in degrading the economics of the manufacturing method. Accordingly, if the second cooling means is composed of a cooler including the above-described shell, tube and coil spring, the ratio "(volumetric flow rate of polymerization solution flowing within the tube of second cooling means)/(internal surface area of the tube of second cooling means)" is preferably 0.2 $m^3/h/m^2$ or higher but not higher than 0.5 $m^3/h/m^2$. With the ratio "(volumetric flow rate of polymerization solution flowing within the tube of second cooling means)/(internal surface area of the tube of second cooling means)" being within the above-described range, it is possible to approximate the cooler exit temperature of the polymerization solution circulated by the circulating cooling means as close as possible to the internal temperature of the polymerization vessel. As a result, it is possible to narrow the temperature distribution of a polymerization solution within the polymerization vessel, thereby uniformizing the composition of the polymer resin.

If a polymer resin to be manufactured is a styrene-acrylonitrile copolymer resin (SAN), the temperature of a raw material injected through the raw material-injecting nozzle into the protruding part is preferably −5° C. or higher but not higher than 20° C. and, more preferably, 0° C. or higher but not higher than 10° C. This raw material can be previously cooled using, for example, a cooling medium such as chilled water or brine. Since water is often dissolved in acrylonitrile which is a raw material, this water is frozen onto the inner wall of the cooling apparatus if the temperature of the raw material is lowered excessively, thus possibly degrading the cooling functional capability of the cooling apparatus. On the other hand, if the temperature of the raw material is excessively high, the raw material may be caused by the heat of friction between the bearing part and the agitation axis, heat transferred from the polymerization solution having circulated within the second cooling means through the protection part, and heat transferred from within the polymerization vessel through an agitator to undergo a copolymerization reaction in any of the first to third flow paths, or in a gap or the like.

Embodiments (Embodiment 1)

A SAN was manufactured using the manufacturing apparatus illustrated in FIG. 1. This manufacturing apparatus included a polymerization vessel comprising main body 20 and protruding part 21. Within main body 20, the manufacturing apparatus included a screw-type agitation apparatus, an auxiliary agitating blade 17, draft tube 3, tubular cooling coil 4a, and annular header 4b to which the tubular cooling coil was connected. On the outer wall of the polymerization vessel, the manufacturing apparatus included cooling jacket 1. Part of a polymerization solution was retrieved out of main body 20 by circulating pump 7 and, after being cooled by cooler 8, was returned to protruding part 21 so as to be opposite to protection part 9. This cooler 8 included a shell within which a cooling medium flowed, a tube which was formed within the shell and within which a polymerization solution flowed, and a coil spring formed within the tube so as to be able to scrape off adhesion material on the inner wall of the tube by the reciprocal motion of the coil spring.

In addition, the manufacturing apparatus was configured so that a raw material was injected into protruding part 21 from the side face thereof through raw material-injecting nozzle 10. The raw material was cooled by a heat exchanger to 20° C. and was continuously supplied at a flow rate (F) of 2.06 $m^3/h$. The composition of the raw material was set so that the weight ratio of styrene, acrylonitrile, ethyl benzene and tertiary dodecyl mercaptan was 0.5421/0.3539/0.0995/0.0045. The flow rate (D) of a circulating polymerization solution was regulated to 16 $m^3/h$ by adopting a gear pump for circulating pump 7 and controlling the number of rotations thereof.

In addition, the internal volume (B) of this polymerization vessel was 2.67 $m^3$, the total sum (A) of the external surface areas of draft tube 3, tubular cooling coil 4a and annular header 4b and the area of the outer wall of main body 20 covered by cooling jacket 1 was 40 $m^2$, and the internal surface area (C) of the tube of cooler 8 was 49.67 $m^2$. On the other hand, the volumetric flow rate (E) of a polymerization solution circulating within the main body was set to 200 m³/h by regulating the number of rotations of the agitation apparatus to 80 rpm.

The polymerization temperature was maintained at 144° C., by controlling the temperature of a cooling medium flowed through the draft tube, the tubular cooling coil, the cooling jacket, and the shell of cooler 8. The flow rate of this cooling medium was set to 90 m³/h. The polymerization temperature was measured with a thermometer inserted 200 mm inward from the outer wall of the main body in the middle of the upper and lower tangent lines of the main body of the polymerization vessel.

A polymerization solution continuously retrieved from solution-retrieving port 12 installed on the upper head of the main body was introduced into a shell-and-tube type heat exchanger and a gas-liquid separator described in Japanese Patent Publication No. 48-29797. Next, an unreacted monomer, a solvent and a SAN were separated from this polymerization solution. At this time, the pressure of the gas-liquid separator was constantly maintained at 40 Torr, and the temperature of a heat medium flowed through the heat exchanger was regulated so that the temperature of the separated SAN was 220° C. After this, the SAN was pelletized into a product.

Using the SAN manufactured as described above, test pieces were created, so that the size thereof was 50 mm in depth length×50 mm in width×3 mm in thickness, by means of injection molding, and the haze values of the test pieces were measured. As an injection molder, the SJ-35C Dynamelt made by Meiki Co., Ltd. was used. Molding conditions were set so that the temperature of a cylinder was 220° C. for all of the front, middle and rear parts thereof, the injection ratio to 60%, and the mold temperature to 60° C.

In addition, three test pieces were measured with the NDH-2000 haze meter made by Nippon Denshoku Industries Co., Ltd. using an integrating sphere method and a C light source, according to JIS K-7105-1981, to evaluate the haze value as an average of the values thus measured. Furthermore, an acrylonitrile component (PAN) in the product was determined using the elemental analyzer Perkin-Elmer 2400II CHNS/O Analyzer. Still further, a melt flow index (MFI), which was important as a data item of the SAN's physical properties, was evaluated at a measurement temperature of 200° C. and a measurement weight of 5 kg according to ASTM D-1238. Table 1 shows the results of measuring the haze value, acrylonitrile component, and melt flow index (MFI).

(Embodiment 2)

In the manufacturing apparatus used in embodiment 1, another set of circulating outlet nozzle 6, circulating pump 7, cooler 8 and circulating inlet nozzle 18 was installed and a raw material feed flow rate (F) was set to 2.43 m³/h. A SAN was manufactured under the same conditions as those of embodiment 1, except this parameter. Table 1 shows the results of measuring the haze value, acrylonitrile component, and melt flow index (MFI) of this SAN.

TABLE 1

|  | Embodiment 1 | Embodiment 2 |
|---|---|---|
| Haze (%) | 1.1 | 1.1 |
| A/B | 15.0 | 15.0 |
| A/C | 0.81 | 0.40 |
| D/C | 0.32 | 0.32 |
| E/F | 97 | 82 |
| PAN (wt. %) | 31.1 | 31.1 |
| MFI (g/10 min.) | 3.3 | 3.2 |
| Rate of SAN production (kg/h) | 815 | 961 |

The invention claimed is:

1. An apparatus for manufacturing a polymer resin, comprising:
    a polymerization vessel including a main body, and a protruding part which protrudes downwardly from a bottom face of the main body and a lower part of which is composed of a bottom cover;
    an agitation apparatus including a driving part installed above the main body, a rotatable agitation axis connected to the driving part and extending from the driving part into the protruding part, and a blade provided on a side face of the agitation axis;
    a bearing part provided on the bottom cover of the protruding part so as to cover the side face of the agitation axis without coming into contact therewith and so as to form a gap between the bearing part and the side face of the agitation axis and between the bearing part and a bottom face of the agitation axis;
    a solution-retrieving port provided in the main body;
    a protection part covering the side face of the agitation axis without coming into contact therewith and forming a first flow path between the protection part and the side face of the agitation axis within the protruding part;
    a first cooling means provided within the main body;
    a circulating cooling means including a circulating inlet nozzle provided on a side face of the protruding part so as to be opposite to the protection part, a circulation pipeline leading from the main body to the circulating inlet nozzle, and a second cooling means and a circulating pump coupled with the circulation pipeline at a point midway therethrough;
    a third cooling means provided so as to cover an outer wall of the polymerization vessel;
    a raw material-injecting nozzle coupled with the protruding part; and
    a flow path-constituting part provided between the bearing part and the protection part so as to cover the side face of the agitation axis and so as to fix the bearing part and the protection part, the flow path-constituting part forming a second flow path between the side face of the agitation axis and the flow path-constituting part and a third flow path for coupling the second flow path with the raw material-injecting nozzle,
    wherein the first to third flow paths constitute a continuous flow path,
    an uppermost end of the first flow path is opened to the inside of the protruding part, and
    the gap, part of the first flow path other than the uppermost end, the second flow path and the third flow path are isolated from the inside of the protruding part.

2. The apparatus for manufacturing a polymer resin according to claim 1,
    wherein the main body further includes a pressure-releasing part to be opened when the internal pressure of the polymerization vessel is a predetermined pressure or more, so as to depressurize the inside of the polymerization vessel,
    the circulation pipeline is coupled with a side face of the main body, and
    a height from a tangent line of the main body to an uppermost end of an inner wall of the circulation pipeline is 0.2 D or greater but not greater than 0.5 D, assuming an inner diameter of a cylindrical part of the main body is D.

3. The apparatus for manufacturing a polymer resin according to claim 1,
    wherein the first cooling means comprises:
        a draft tube surrounding the blade of the agitation apparatus and including a cooling medium flowing inside the draft tube;

a tubular cooling coil provided between the draft tube and an inner wall of the main body; and annular headers provided in upper and lower parts of the polymerization vessel so as to flow a cooling medium through the tubular cooling coil, the third cooling means comprises a cooling jacket, and AB is 6 m²/m³ or greater but not greater than 25 m²/m³, where A (m²) is the "sum of external surface areas of the draft tube, the tubular cooling coil and the annular headers within the main body and area of the outer wall of the main body covered with the cooling jacket," and B (m³) is the "internal volume of the polymerization vessel."

4. The apparatus for manufacturing a polymer resin according to claim 1, wherein the first cooling means comprises:

a draft tube surrounding the blade of the agitation apparatus and including a cooling medium flowing inside the draft tube;

a tubular cooling coil provided between the draft tube and an inner wall of the main body; and annular headers provided in upper and lower parts of the polymerization vessel so as to flow a cooling medium through the tubular cooling coil, the second cooling means comprises a cooler, the cooler including a shell with a cooling medium flowing therein, a tube connected to the circulation pipeline and provided within the shell, and a coil spring provided within the tube and capable of at least one of reciprocal motion and rotational motion, the third cooling means comprises a cooling jacket, and A/C is 0.2 or greater but not greater than 1.0, where A (m²) is the "sum of external surface areas of the draft tube, the tubular cooling coil and the annular headers within the main body and area of the outer wall of the main body covered with the cooling jacket," and C(m²) is the "internal surface area of the tube of the cooler."

5. The apparatus for manufacturing a polymer resin according to claim 1, wherein an uppermost end of the protection part is positioned upper than an uppermost end of an inner wall of the circulating inlet nozzle and lower than the bottom face of the main body.

6. The apparatus for manufacturing a polymer resin according to claim 5, wherein the uppermost end of the protection part is positioned 0.5 DN or more upper than the uppermost end of the inner wall of the circulating inlet nozzle, assuming an inner diameter of the circulating inlet nozzle is DN.

7. The apparatus for manufacturing a polymer resin according to claim 1, wherein the polymer resin is a copolymer resin.

8. The apparatus for manufacturing a polymer resin according to claim 7, wherein the copolymer resin is a styrene-acrylonitrile copolymer resin (SAN).

9. A method for manufacturing a polymer resin using the apparatus for manufacturing according to claim 1, the method comprising:

preparing the polymerization vessel loaded with a polymerization solution;

injecting a raw material from the raw material-injecting nozzle through the third flow path, the second flow path and the first flow path into the protruding part;

performing a polymerization reaction in which the polymer resin is formed with mixing the raw material with the polymerization solution by rotating the agitation axis;

cooling the polymerization solution within the polymerization vessel by the first and third cooling means;

retrieving the polymerization solution from the main body using the circulating pump, cooling the polymerization solution by the second cooling means, and then returning the polymerization solution to the protruding part through the circulating inlet nozzle; and retrieving the polymerization solution from the solution-retrieving port and then separating the polymer resin from the polymerization solution.

10. The method for manufacturing a polymer resin according to claim 9, wherein volumetric flow rate of the polymerization solution circulating within the main body is 50 times or more but not more than 300 times volumetric flow rate of the raw material injected from the raw material-injecting nozzle.

11. The method for manufacturing a polymer resin according to claim 9, wherein the second cooling means comprises a cooler, the cooler including a shell with a cooling medium flowing therein, a tube connected to the circulation pipeline and provided within the shell, and a coil spring provided within the tube and capable of at least one of reciprocal motion and rotational motion, and the ratio "(volumetric flow rate of the polymerization solution flowing within the tube of the second cooling means)/(internal surface area of the tube of the second cooling means)" is 0.2 m³/m²/h or higher but not higher than 0.5 m³/m²/h.

12. The method for manufacturing a polymer resin according to claim 9, wherein the polymer resin is a styrene-acrylonitrile copolymer resin (SAN), and the temperature of the raw material injected through the raw material-injecting nozzle into the protruding part is −5° C. or higher but not higher than 20° C.

13. A polymerization vessel for a polymer resin, comprising:

a main body;

a protruding part protruding downwardly from a bottom face of the main body and including a lower part composed of a bottom cover;

an agitation apparatus including a rotatable agitation axis connected to a driving part installed above the main body and extending from the driving part into the protruding part, and a blade provided on a side face of the agitation axis;

a bearing part provided on the bottom cover of the protruding part so as to cover the side face of the agitation axis without coming into contact therewith and so as to form a gap between the bearing part and the side face of the agitation axis and between the bearing part and a bottom face of the agitation axis;

a solution-retrieving port provided in the main body;

a protection part covering the side face of the agitation axis without coming into contact therewith and forming a first flow path between the protection part and the side face of the agitation axis within the protruding part;

a first cooling means provided within the main body;

a circulating inlet nozzle provided on a side face of the protruding part so as to be opposite to the protection part and so as to flow a cooled polymerization solution therein;

a raw material-injecting nozzle coupled with the protruding part; and a flow path-constituting part provided between the bearing part and the protection part so as to cover the side face of the agitation axis and so as to fix the bearing part and the protection part, the flow path-constituting part forming a second flow path between the side face of the agitation axis and the flow path-constituting part and a third flow path for coupling the second flow path with the raw material-injecting nozzle, wherein the first to third flow paths constitute a continuous flow path, an uppermost end of the first flow path is opened to the inside of the protruding part, and the gap, part of the first flow path other than the uppermost end, the second flow path and the third flow path are isolated from the inside of the protruding part.

14. The polymerization vessel for a polymer resin according to claim 13, further including a third cooling means provided so as to cover an outer wall of the main body.

\* \* \* \* \*

UNITED STATES PATENT AND TRADEMARK OFFICE
CERTIFICATE OF CORRECTION

PATENT NO.        : 8,492,490 B2
APPLICATION NO.   : 13/119946
DATED             : July 23, 2013
INVENTOR(S)       : Kenichirou Matsuba et al.

It is certified that error appears in the above-identified patent and that said Letters Patent is hereby corrected as shown below:

In the Specifications:

On column 18, line 33-34, change "peroxide,acetyl" to --peroxide, acetyl--.

In the Claims:

On column 23, line 7, In Claim 3, change "AB" to --A/B--.

Signed and Sealed this
Sixth Day of May, 2014

Michelle K. Lee
*Deputy Director of the United States Patent and Trademark Office*